(No Model.)
W. COOK & J. R. GENT.
BOLTING REEL.
No. 430,836. Patented June 24, 1890.
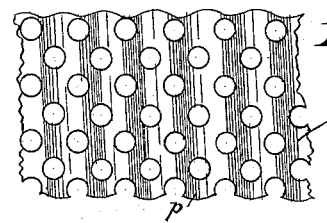
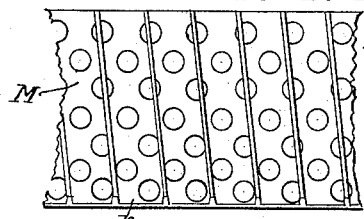
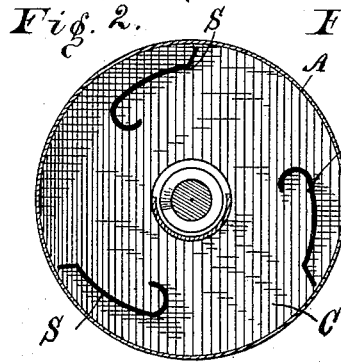
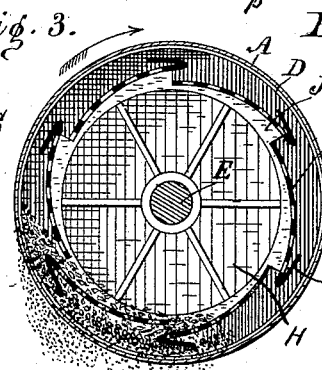
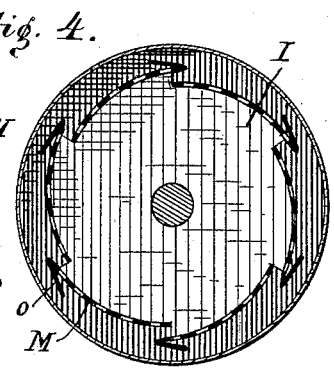
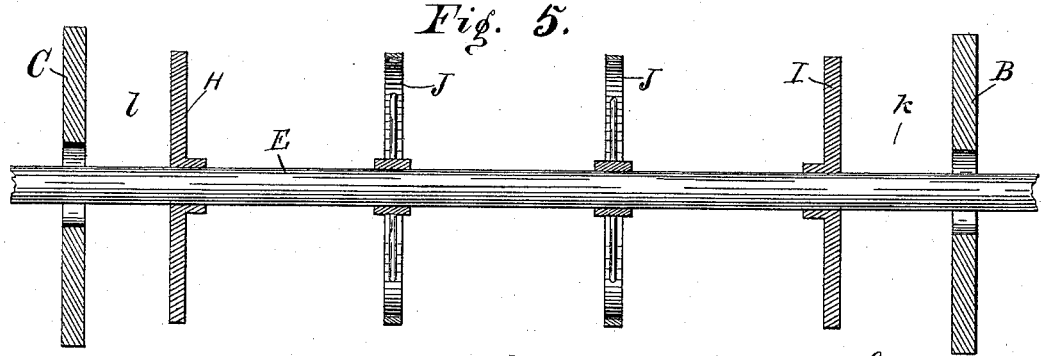
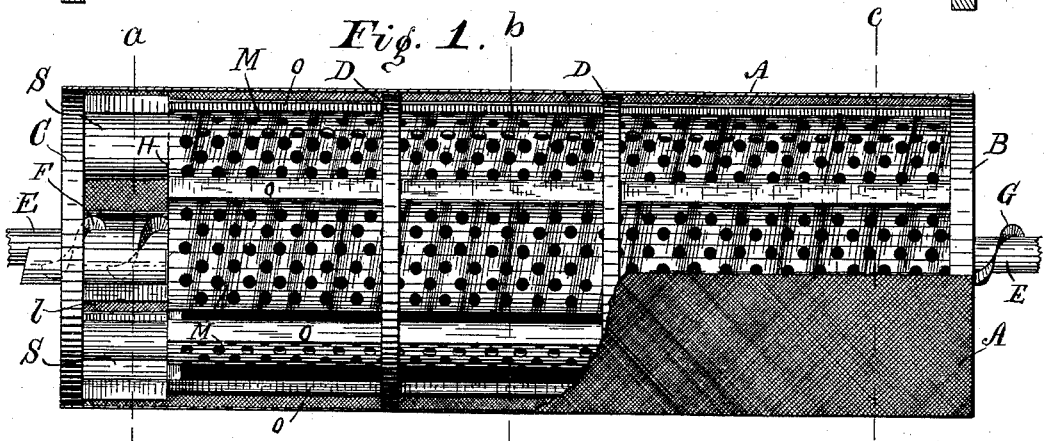
Witnesses
V. M. Hood.
Mabel Hood.
Inventors:
William Cook.
John R. Gent.
By their Attorney
H. P. Hood.

UNITED STATES PATENT OFFICE.

WILLIAM COOK AND JOHN R. GENT, OF COLUMBUS, INDIANA.

BOLTING-REEL.

SPECIFICATION forming part of Letters Patent No. 430,836, dated June 24, 1890.

Application filed November 2, 1889. Serial No. 329,063. (No model.)

*To all whom it may concern:*

Be it known that we, WILLIAM COOK and JOHN R. GENT, citizens of the United States, residing at Columbus, in the county of Bartholomew and State of Indiana, have invented a new and useful Improvement in Bolting-Reels, of which the following is a specification.

Our invention relates to an improvement in bolting-reels for separating offal and waste from ground grains or other material.

In bolting-reels as heretofore constructed the ground material to be bolted rests in an annular space between the peripheral covering of bolting-cloth, through which the valuable portions of the ground material may pass, and a central core or cylinder impervious to the ground material. When the reel is in motion, the agitation of the contents causes the finer particles to settle to the bottom of the mass next to the bolting-cloth, the larger particles arranging themselves according to size and specific gravity above, and the light chaff or offal at the top of the mass. This natural arrangement of the ground material facilitates the passage of the valuable portions through the bolting-cloth; but this is in a large measure counteracted by the lifting and rolling movement of the reel, which again intermingles the offal and the valuable portions in such a manner that the offal comes in contact with and lies against the interior surface of the bolting-cloth, thus preventing the passage of the finer particles.

The object of our improvement is to cause the rapid separation of the offal from the other parts, and to prevent it when once separated from again becoming mixed with the finer parts or lying in contact with the bolting-cloth.

The accompanying drawings illustrate our invention.

Figure 1 represents a side elevation of our bolting-reel having a portion of the bolting-cloth removed. Figs. 2, 3, and 4 represent, respectively, transverse sections at *a*, *b*, and *c*, Fig. 1. Fig. 5 shows the shaft and attached disks. Fig. 6 represents a view, on an enlarged scale, of the inner surface of the separating-blades. Fig. 7 represents a similar view of a modified form of the same.

The exterior and general features of the reel, aside from its interior separating-blades, do not differ from well-known forms.

The bolting-cloth A is secured to the circular heads B and C and intermediate rings D D, so as to form a hollow cylinder having a central longitudinal shaft E, provided near each end with spiral conveyer-blades F and G, all in the usual well-known manner. Secured to shaft E between the heads B and C are a pair of solid disks H and I and a series of open disks J J, all having correspondingly-serrated peripheral surfaces. Disks H and I are of less diameter than the heads B and C, and are arranged, respectively, a short distance from and between them, so as to leave a receiving-chamber *k* and a tailings-chamber *l*. The open disks J are arranged at regular intervals between the solid disks H and I, and their purpose is merely to support the separating-blades, as hereinafter explained. Secured to the peripheral edges of the disks H, I, and J are a series of plates M M, which I shall designate as "separating-blades." These blades are formed of coarsely-perforated sheet metal, and their arrangement is such that they extend longitudinally along the interior of the reel from the head B to the disk H, the edges of the adjusting-plates slightly overlapping and separated, the advancing or front edge of each blade being nearer the bolting-cloth than its rear edge, so that the several plates form together a series of open buckets, arranged concentrically around the shaft and adapted to dip into and skim the material resting on the bolting-cloth and discharging into each other. Secured to or formed integral with the front edge of each of the blades M is a guard-plate *o*, which extends backward and outward from the blade at a tangent thereto, its lower or rear edge being nearer the bolting-cloth than the front edge of the blade, its purpose being to prevent the contents of the reel from packing against and obstructing the perforations in the blade, and to prevent the lighter portion of the offal from rolling back when raised by the bolting-cloth, as hereinafter set forth.

For the purpose of assisting the movement of the offal, so that it will move more quickly than the flour from the head to the tail of the reel, we form shallow channels $p$, diagonally across the interior surface of the separating-blades. These channels may be formed by corrugating the blade, as shown in Fig. 6, or by securing ribs $r$ thereto, as shown in Fig. 7.

For the purpose of lifting the tailings and discharging them onto the conveyer F, we form across the tailings-chamber $l$ a series of buckets S, whose forward edges extend radially nearly out to the bolting-cloth. Buckets S are formed, preferably, of an imperforated extension of each alternate blade M; but they may be also formed of separate pieces of sheet metal.

In operation, the reel being set level or nearly level and revolved in the direction indicated by the arrow in Fig. 3, the ground wheat or other material passes from the mill into the receiving-chamber $k$ at the head of the reel and falls onto the inner surface of and through that portion of the blades M which extend across the receiving-chamber. As the material distributes itself over the reel and is raised on the forward side of the bolting-cloth by the turning of the reel, it becomes arranged in a manner similar to that shown in Fig. 3, the finer portions lying next to and passing through the first bolting-cloth, the coarser particles above them, and the offal on top. As the mass slides backward, yielding to the force of gravitation, its upper portion, containing the offal and coarser particles, is taken up by one or more of the separating-blades M and retained until it passes from plate to plate and through the perforations in the plates, at the same time being moved along the diagonal channels $p$ toward the tail of the reel at a more rapid rate than the mass of finer material below, and, falling again on top of the finer material, to be again taken up by succeeding separating-blades. As the material is lifted by the bolting-cloth, the guard-plates $o$ protect the perforations near the front edges of their respective separating-blades, so that the perforations are not clogged by the mass below, and they also operate to prevent the offal from falling back with the finer particles. When the offal and tailings have reached the tailings-chamber $l$, they are taken by the buckets S and dropped onto the conveyer F. By this construction the separation of the flour and other valuable parts from the tailings is more rapidly accomplished, and the abrading action of the offal on the bolting-cloth is largely prevented.

We claim as our invention—

1. In a bolting-reel, the combination, with the outer covering of bolting material, an inner cylinder consisting of a series of perforated separating-blades arranged longitudinally and centrally within the covering to form a series of open buckets discharging into each other, and having their forward edges nearer the bolting-cloth than their rear edges, whereby the offal and coarser particles are first separated from the mass of ground material, and then returned thereto through the blades, substantially as set forth.

2. In a bolting-reel, the combination, with the outer covering of bolting material, an inner cylinder consisting of a series of separating-blades arranged longitudinally and centrally within the covering to form a series of open buckets discharging into each other, and having their forward edges nearer the bolting-cloth than their rear edges, said separating-blades having their interior surfaces provided with a series of diagonal channels, whereby the offal is separated from the mass of ground material and is forced toward the tail of the reel, substantially as set forth.

3. In a bolting-reel, the combination, with the outer cylinder and the inner cylinder consisting of a series of perforated separating-blades arranged with their forward edges nearer the outer cylinder than their inner edges, of the guard-plates secured to the forward edges of the separating-blades and extending backward over the blades and at a tangent thereto, substantially as and for the purpose set forth.

4. In a bolting-reel, the cylinder having a peripheral covering of bolting material, a receiving-chamber at one end, and a tailings-chamber at the other end, the inner cylinder consisting of a series of perforated separating-blades arranged centrally and longitudinally within the covering to form a series of open buckets discharging into each other, the guard-plates attached to the forward edges of said separating-blades and projecting backward therefrom, and the series of lifting-buckets arranged across the tailings-chamber, all combined and arranged to cooperate substantially as set forth.

WILLIAM COOK.
JOHN R. GENT.

Witnesses:
GEORGE PENCE,
ED. S. NORROTNY.